United States Patent
Bies

(10) Patent No.: US 8,108,894 B2
(45) Date of Patent: Jan. 31, 2012

(54) INTERNET-BASED SUBMISSION OF CABLE NETWORK CONTENT

(76) Inventor: Richard J. Bies, Port Charlotte, FL (US)

( * ) Notice: Subject to any disclaimer, the term of this patent is extended or adjusted under 35 U.S.C. 154(b) by 1089 days.

(21) Appl. No.: 10/523,827

(22) PCT Filed: Aug. 8, 2003

(86) PCT No.: PCT/US03/22502
§ 371 (c)(1),
(2), (4) Date: Apr. 15, 2005

(87) PCT Pub. No.: WO2004/015519
PCT Pub. Date: Feb. 19, 2004

(65) Prior Publication Data
US 2005/0235310 A1    Oct. 20, 2005

Related U.S. Application Data

(60) Provisional application No. 60/402,052, filed on Aug. 9, 2002.

(51) Int. Cl.
H04N 7/10 (2006.01)
H04N 7/025 (2006.01)

(52) U.S. Cl. ............ 725/35; 725/34; 725/42; 725/60; 705/14.54; 705/14.58

(58) Field of Classification Search .......... 725/32, 725/34–35, 42, 46, 112, 60; 705/14.1, 14.54, 705/14.55, 14.58
See application file for complete search history.

(56) References Cited

U.S. PATENT DOCUMENTS

| 5,600,364 | A | | 2/1997 | Hendricks et al. | |
|---|---|---|---|---|---|
| 5,835,087 | A | | 11/1998 | Herz et al. | |
| 5,948,061 | A | * | 9/1999 | Merriman et al. | 709/219 |
| 6,005,565 | A | | 12/1999 | Legall et al. | |
| 6,119,101 | A | * | 9/2000 | Peckover | 705/26 |
| 6,177,931 | B1 | | 1/2001 | Alexander et al. | |
| 6,247,047 | B1 | * | 6/2001 | Wolff | 709/219 |
| 7,302,696 | B1 | * | 11/2007 | Yamamoto | 725/23 |
| 7,386,871 | B1 | * | 6/2008 | Knudson et al. | 725/92 |
| 2001/0042251 | A1 | * | 11/2001 | Marshall et al. | 725/60 |
| 2001/0049821 | A1 | | 12/2001 | Ochi | |
| 2002/0002552 | A1 | * | 1/2002 | Schultz et al. | 707/3 |
| 2002/0059590 | A1 | | 5/2002 | Kitsukawa et al. | |
| 2002/0066097 | A1 | | 5/2002 | Hattori et al. | |

(Continued)

FOREIGN PATENT DOCUMENTS

EP    1 225 531 A2    7/2002

(Continued)

OTHER PUBLICATIONS

Japanese Office Action mailed Aug. 18, 2009.

(Continued)

*Primary Examiner* — Brian Pendleton
*Assistant Examiner* — Nnenna Ekpo
(74) *Attorney, Agent, or Firm* — Sughrue Mion, PLLC

(57) ABSTRACT

A cable network content delivery system providing advertising information via a cable network and an advertising content interface are described. An advertiser submits advertising content over an internet which is then adapted for a cable network. A data gateway stores the advertising information. The system processes a user command received via the cable network, including an advertising information search command, and provides advertising information retrieved via the cable network.

20 Claims, 2 Drawing Sheets

U.S. PATENT DOCUMENTS

| | | | |
|---|---|---|---|
| 2002/0069405 A1 | 6/2002 | Chapin et al. | |
| 2002/0095674 A1 | 7/2002 | Lowthert et al. | |
| 2002/0095675 A1* | 7/2002 | Lowthert et al. | 725/34 |
| 2002/0100042 A1 | 7/2002 | Khoo et al. | |
| 2002/0104090 A1* | 8/2002 | Stettner | 725/60 |
| 2003/0040970 A1* | 2/2003 | Miller | 705/26 |
| 2008/0196053 A1* | 8/2008 | Thomas et al. | 725/9 |
| 2009/0049483 A1* | 2/2009 | Townsend et al. | 725/60 |
| 2009/0193458 A1* | 7/2009 | Finseth et al. | 725/34 |

FOREIGN PATENT DOCUMENTS

| | | |
|---|---|---|
| JP | 2001-258010 A | 9/2001 |
| JP | 2001-326922 A | 11/2001 |
| JP | 2002-024358 | 1/2002 |
| JP | 2002-063331 A | 2/2002 |
| JP | 2002-063482 | 2/2002 |
| JP | 2002-157512 | 5/2002 |
| JP | 2002-157513 | 5/2002 |
| JP | 2002-185985 A | 6/2002 |
| JP | 2002-207912 A | 7/2002 |
| JP | 2002-531897 | 9/2002 |
| WO | WO 00/33160 A2 | 6/2000 |
| WO | WO 01/15036 A2 | 3/2001 |
| WO | WO 01/73595 A2 | 10/2001 |

OTHER PUBLICATIONS

Japanese Office Action dated Dec. 2, 2008.

* cited by examiner

INTERNET-BASED SUBMISSION OF CABLE NETWORK CONTENT

CROSS-REFERENCE TO RELATED APPLICATIONS

This application claims the benefit of U.S. Provisional Application No. 60/402,052, filed Aug. 9, 2002, which is incorporated by reference, herein, in its entirety.

FIELD OF THE INVENTION

The present invention is in the fields of television advertising delivery and selection, and content submission and processing over an internet.

BACKGROUND OF THE INVENTION

Television advertising is a multibillion-dollar business in the United States and growing. Telephone directory, including "Yellow Pages" advertising, and other physical business directory advertising, is also a billion dollar business in the United States and has shown significant growth in past years.

Today, advertisers who wish to have their businesses listed in a telephone directory or need their advertisements played on television must find a way to submit the information to a cable company or to a cable television content provider. The submission process entails a delay in getting advertising content run or displayed. Also, once the listing or advertisement is submitted, that submission is run for a previously agreed upon period of time, such as for a 13 week television season or cycle or for some other period of time. In a telephone directory, the listing or advertisement remains unchanged until the next publication and release of the directory. Thus the advertiser is "stuck" with a particular listing or advertisement for the predetermined period of time, even if the needs of the advertiser have changed, or if, for example, new contact information of the advertiser should be listed or run.

At the same time, the television viewer has no means of viewing listings for advertising interactively. For example, if the television viewer wishes to view advertising content information of advertisers in a particular geographic area, there is no advertising search option to learn about the products through television advertising in real time.

There are systems that allow a user to surf the Internet via a cable television connection. Using such a system, the user can access product listings and advertiser listings. However, such systems do not allow advertisers to submit advertising content over the internet for storage in a format suitable for broadcasting to a cable network. That is, such systems allow a user to surf the Internet via cable television, but do not combine the power of cable broadcasting with Internet based advertising content submission to focus advertising content delivery.

Pay-per-view and emerging services such as television on demand allow a user to have a degree of control over cable television content, but do not allow advertisers to submit content over the Internet, nor do they allow a user to search for or select advertising information.

SUMMARY OF THE INVENTION

Embodiments of the present invention help overcome the above-described disadvantages and address other problems. Any given particular embodiment of the present invention may or may not overcome any one or more of the discussed disadvantages.

What is proposed is a cable network content delivery system configured to provide advertising information via a cable network, the cable network content delivery system having: a data gateway configured to store the advertising information, the advertising information adapted by a cable content generator for transmission over the cable network based on content information received from an advertiser over an internet; an advertising information retriever configured to process a user command received via the cable network, and to retrieve the advertising information from the data gateway based on the user command; and an advertising information provider configured to transmit, based on the user command, advertising information retrieved by the advertising information retriever via the cable network.

Further, the user command may be transmitted by a user via a set-top box or a digital cable-ready television to the cable network.

Also, the advertising information may include at least an advertiser listing, a text message, a survey questionnaire, a picture, an audio clip, or a video clip.

However, the cable network content delivery system may be implemented as at least two data processors: a cable headend server or a master server.

Also, the user command can be an advertiser search command and the advertiser search command may include an advertising information geographic designation or an advertising information temporal designation.

The advertising information retriever can be configured to process a user command including an order for a selected item based on the advertising information retrieved, and to process another user command including a response to a survey questionnaire transmitted to the user as the advertising information or an order for a selected product.

According to another aspect of the invention, an advertising content interface is provided, which provides advertising information adapted for transmission over a cable network by a cable network headend, the advertising content interface having: an interface unit having to receive content information from an advertiser via an internet; a cable content generator configured to process the content information received by the advertiser interface and to generate advertising information adapted for transmission over the cable network; and a data gateway configured to store the advertising information generated by the cable content generator and to respond to an information demand from the cable network by providing the advertising information to the cable network headend for transmission over the cable network.

The data gateway may provide the advertising information to the cable network headend for transmission over the cable network responsive to the information demand, the information demand being a transmission of a user command over the cable network by a user.

A process to implement a system according to the invention is also provided.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. Aspects of the illustrative, non-limiting embodiments of the present invention will become more

DETAILED DESCRIPTION

Figure 1:
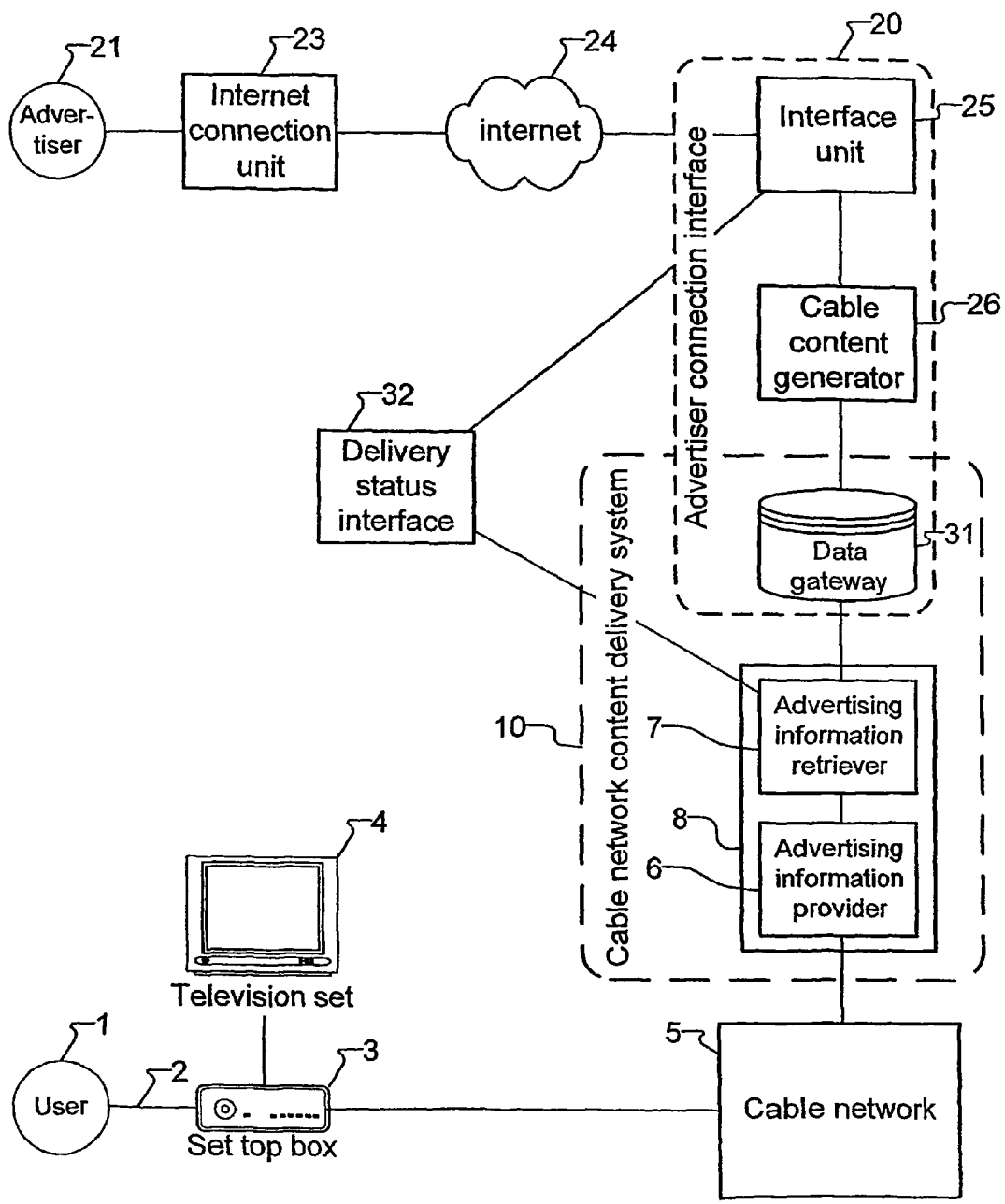
FIG. 1 is a schematic representation of cable network content delivery system and advertising content interface according to an aspect of the present invention.

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

First, features of the cable network content delivery system will be described with reference to FIG. 1. A user 1 viewing programming over a cable television network 5 via a television set 4 controls cable network programming. According to a preferred embodiment, the user may control a set-top box 3 to control the cable network content. For example, the user may use a remote control device (not shown) using a wireless connection 2 to control the set-top box 3. The set-top box 3 is connected to a cable network 5 via a cable wire such as coaxial cable, optical cable, an antenna receiving a television broadcast frequency, satellite dish or other wireless connection, as is well known. The cable network connects the set-top box 3 with the cable head end 8 via the cable network 5. The cable headend 8 may include an application server for the cable network providing content information for the network. The cable headend 8 may be connected to a database or data gateway 31 from which it retrieves information, such as advertising information for display on the cable network.

FIG. 1 shows that an advertiser 21 may submit content information over an internet connection 23, which is transmitted over the internet 24 to an advertising connection interface 20, which includes the interface unit 25. The advertiser can connect to the internet in any one of a number of conventional ways, such as by a modem or an ISDN or DSL connection unit 23. The advertising information is generated by the cable content generator 26 from content information submitted by the advertiser via the interface unit 25. The cable content generator 26 adapts the advertiser content information to a format suitable for transmission over the cable network 5 by generating advertising information suitable for the cable network 5, and stores the advertising information in data gateway 31 for retrieval by cable headend 8. The data gateway 31 may include one or more databases storing the advertising information.

The user may access advertiser information for advertisers that have provided advertiser information. For example, using a remote control device to operate a set-top box 3 using a wireless connection 2, the user 1 may regulate interactively using any one of several means the content of the cable network received. Such means may include a computer or a data processor logically connected to the cable network terminal to interact therewith.

Similarly, the user may view the cable network content over a television set 4, but is not limited to a conventional CRT television set. The television set may be a flat panel LED, plasma or micro-mirror display, a front projection or rear-projection device or any other displays suitable to convey audio/visual information. Also, the cable network may be accessed via an internet terminal or other type of digital connection.

In a preferred embodiment, the user may make a menu selection via the set-top box 3 by, for example, choosing a hotel category from a "Yellow Pages" feature of the system. For example, a user 1 who wishes to learn about, say, hotels in San Francisco using advertising information transmitted over cable television can issue a user command via set-top box 3. There may also be other ways of providing user commands to the system, such as through pre-stored user commands for advertising searching.

The user command is received and processed by the advertising information retriever 7, which may be a module of the cable headend 8. The advertising information retriever retrieves advertising information from the data gateway 31 in response to the user command.

Figure 2:
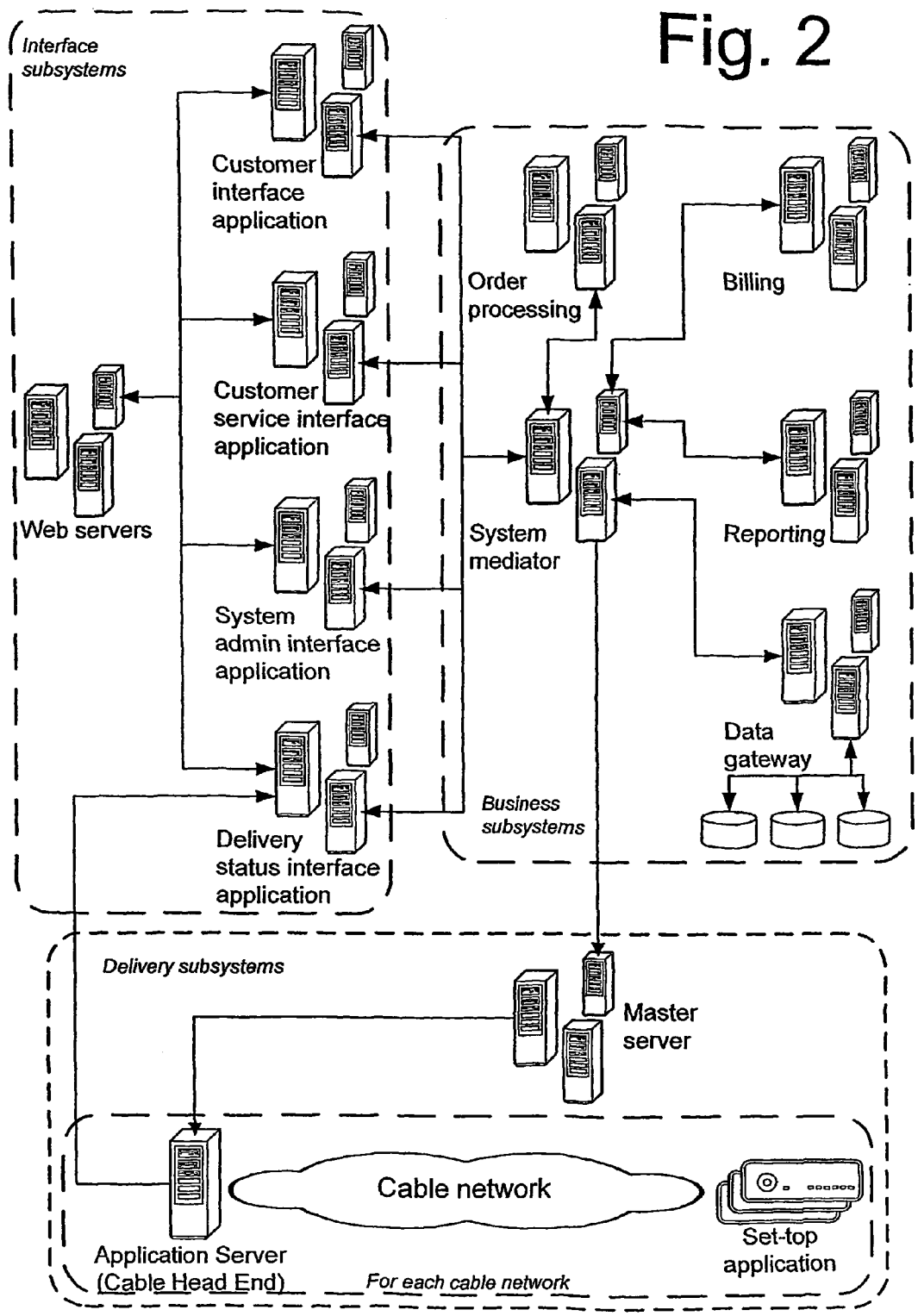
FIG. 2 is a schematic representation of a concrete embodiment of a system according to the present invention.

Referring to FIG. 2, a preferred embodiment of a system according to the present invention will be described. A set-top box application is a module associated with a set-top box. According to an embodiment, this module may be implemented as a software application residing in the set-top box. Alternatively, it may be a firmware or hardware module inside or associated with the set-top box. Via the cable network, the set-top box application is connected to an application server, which in a preferred embodiment resides on or is associated with the cable headend. According to an embodiment, the application server is configured specifically for each cable network and is connected to a master server (or to a group of master servers as shown in FIG. 2). It will be clear that more than one cable network may be connected to the data gateway, to provide advertising information to several cable networks. In one embodiment of the present invention, each cable network may have its own version of a data gateway, or a database derived from the data gateway, to provide advertising information suitable for the network and to do so more expeditiously.

The master server retrieves advertising information from the data gateway, shown as part of the business subsystems in FIG. 2. In an alternative embodiment, the application server configured for a particular cable network is provided with its own data gateway to facilitate and speed delivery of cable content. Responsive to a user command, the data gateway provides advertising information over the cable network.

On the advertiser side, FIG. 2 shows web servers through which advertisers can place orders and submit content information for transmission. The web servers are supported (or are made up of) the different modules shown in the interface subsystems section of FIG. 2. The interface subsystem include the customer interface, the customer service interface application, and the systems administration interface application. While the various components described in FIG. 2 and throughout the present disclosure are designated by such terms as "servers," "interfaces," "processors" or "applications," a person of ordinary skill in the art will recognize that these components may be implemented as software residing on a host computer or on more than one host, or as firmware or hardware of one or more units without departing from the spirit of the invention.

FIG. 2 also shows the business subsystems, including an order processor configured to receive an order submitted via the interface subsystems, a billing module for validating an order for advertising, checking the credit or debit card and validating the transaction, a reporting module for generating reports for internal systems maintenance and for business record keeping, and a the data gateway for storing advertising information. The system mediator controls the elements of the business subsystems and the flow of information therein. The delivery status interface application, shown as part of the interface subsystems is designed to collect and report to the advertiser about the delivery status of advertising information delivered over the cable network. It will be readily understood by those of ordinary skill in the art that one or more of the elements of FIG. 2 may be safely omitted and that two or more of the elements of FIG. 2 may be combined without departing from the spirit of the invention. Some aspects of the business subsystems are not essential for the present invention and are provided merely for the sake of rigorous description.

As is well known in the art, various system interfaces and modules described herein can be modified and combined in various ways. For example the cable headend may be configured as a module in an applications server located in a host computer or may be housed on several computers or data processors. Similarly, the cable content generator may be an application run on a processor shared with other applications, or may be located on various host computers. Those familiar with this field will recognize that various units and modules herein described may be implemented as software, firmware or hardware, or some combination of the these without departing from the spirit of the invention.

Throughout this discussion, the term "business" may be used to refer to an advertiser, whether a commercial enterprise, not-for-profit organization, association, individual, educational or research institution or state or government agency. Similarly, the term "advertiser" may include a business or any of the other aforementioned categories of advertisers.

Advertising Information

Advertising information may comprise an advertiser directory listing, that includes basic information, including contact information for the advertiser; a logo of the advertiser; a text message from an advertiser; a classified advertisement for a commercial or a non-commercial advertiser; a product promotion, such as rebate, discount, or coupon information; a questionnaire requesting user feedback; a picture of a product offered by an advertiser or the advertiser's place of business; audio and/or video clips featuring a commercial for the advertiser; and an infomercial of several minutes or longer promoting a product for an advertiser.

A conventional television commercial is usually formatted in 15, 30 or 60 second segments of audio/visual information. However, other lengths are also contemplated.

A conventional infomercial is between 1 and 20 minutes in length, but the term as used herein is not limited to that length. As is well known, an infomercial is a longer commercial format, commonly featuring celebrities or well-known sports figures or other personalities, that promotes a product, may have a "talk show" or "interview" format, and may show people using the product.

The advertising information may further include government listings showing local, state, federal or foreign and government information. Those familiar with this field will recognize that combinations of the above listed types of advertising information are possible and often desirable, and that many other types of advertising information are suitable for display and playback on cable television and the examples listed above are merely examples.

According to a preferred embodiment of the invention, advertisers may select different types of information for display as part of their listing. An advertiser listing may contain the full advertiser or business name, address including city, state and postal code. Along with the telephone number, the fax number and an email address may be displayed for the selected record. In addition, advertisers may be able to purchase a purchase option that includes a logo display. If no logo plan (see below) is purchased, then the category logo may be replaced with the local time and temperature or other information as deemed by the local broadcast station, cable network, or the advertising system provider. Similarly, other advertiser information, instead of the advertiser's logo, may be displayed instead of or in addition to the logo.

For purposes of illustrative example, if the advertiser purchases or otherwise requests a text-based advertisement as part of its listing contract, the text will be displayed on screen. The text based advertisement may be free formatted, using various text/word processors and accessed by the advertiser through the Internet with a previously assigned account. This provides a "quick and dirty" method for an advertiser to submit or update information to reach the users.

User Access

The user may have several ways to access the information needed. In a "yellow pages" section, a user can select advertisers by either by business name, telephone number, other identifying entry information (cross-directory information). According to a preferred embodiment of the invention the user can find a business by entering the first letters of a business name via the set-top box, or by entering a telephone number or the contact information. For example, if the user selects by advertiser name, the system will request, for purpose of illustrative example, the first five letters of the business name. Needless to say, other advertiser identifying information could also be requested by the system or chosen to be provided by the user.

Once entered, the selection may be displayed on screen or displayed for further viewing and selecting, and it may be announced over an associated speaker, such as the television set's speaker. Also, instead of a text display of the business, a picture or other video/audio display or clip may be shown to the user, as discussed below.

The Television Yellow Pages Feature

According to a preferred embodiment, a "yellow pages" section will allow accessing the directory by category of advertiser or type of business. According to a preferred embodiment, after a user selects "category" from the menu, the user will be asked to enter the letters, for example the first five letters, of the category of interest. The category may also be selected in other ways.

In one embodiment, as the user enters the letters of a category of advertiser, selections appear beneath the entry area, and arrow keys, such as arrow keys of a set-top box, television set, or remote control, may be used to select the category. Once a category is entered, a category sponsoring advertiser will have its logo displayed on the screen. For example, there may be a logo/category sponsor tile displayed on screen from this point on as the user continues to make selections. Once the business has been selected, the information for that listing will appear.

The screen may advantageously be divided into several tiles, including a text advertising tile, the commercial or infomercial video advertisement tile, a menu selections and data display tile, and a logo, category sponsor or local information tile. Thus, advertisers may purchase the privilege of having their logo displayed while advertisers for a category of product are shown on screen.

A "white pages" section will list names, addresses, telephone numbers and other contact information, and other personal information if desired, of residents of particular geographic areas or of combined geographical areas. This information would be searchable and viewable in ways similar to the other information submitted to the system herein described.

The classifieds section is designed for individual advertisers or businesses, organizations, or others. The classified section is organized by category of product and comprises advertising information about products, including good or services for sale, new or old, for lease, or trade. The classified section may also have singles' categories of people looking for partners.

Advertisers can be advantageously charged for advertising according to the format and length of advertising information and according to the geographic or temporal boundaries within which an advertiser wishes to lists or run the advertising information. In particular, according to an aspect of the invention, an advertiser may elect to have the advertising information made available for display or for playback only in a particular geographic area in order to focus the promotional power of the advertising information to a particular set of users. Similarly, the advertiser can opt to limit the times during which the advertising information is made available for display or play back, in order to maximize the promotional power of the advertising information received for the advertising dollar spent.

For example, an advertiser who wants to promote a pizza parlor in San Francisco may wish to limit display of its advertising information to the Bay Area, or a subsection thereof. Or, it may opt for some portion of the Bay Area and some other adjacent areas. This advertiser can reduce its advertising cost by placing an order such that the system makes its listing available only to users located in the designated areas.

Also, the system may be designed such that the user may designate a geographic area of interest, irrespective of the actual present location of the user, and view advertising listings for the geographic area of interest. According to a preferred embodiment of the invention, in the "yellow pages" section, the user could first select a business in the local broadcast area, in another state, outside the area in the United States, in some designated area of the world outside the United States, some combination of the above areas, or anywhere in the world, is desired. Thus, a user in Washington, D.C. planning a trip to San Francisco may designate San Francisco as the area of interest and view listings limited to the San Francisco area. In this way, the Washington, D.C. user choosing San Francisco as an area of interest would still find the San Francisco pizza parlor which has limited its advertising information delivery to the San Francisco area. According to a preferred embodiment, the user's present location would be a default location, receiving advertising information designated for the user's region, and the user would be able to select a geographic area of interest to view advertiser information from other regions.

Similarly, an advertiser may wish to limit display of its advertising information by time of day or by season, or both. For example, the pizza parlor may wish to have its advertising information run only between the hours of 3 PM and 3 AM. Combinations of geographic and temporal designations would also be made available to advertisers.

It is to be understood that the advertiser may wish to display its basic listing unlimited by geographic or temporal designation, but limit its commercial comprising to a logo display, an audio/video clip or infomercial to a designated geographic area and/or within a temporal restriction.

All text advertisements and other advertising information submitted by an advertiser may be subject to being reviewed for obscene or offensive language, or other offending, unpublishable or unfit or illegal content, and may be rejected. If an advertisement has been rejected, the purchaser may be notified and the advertisement will not be displayed until corrected.

In one embodiment, the advertising information, such as the commercial may be played immediately upon the user's accessing the particular advertiser's listing. The commercial may be played on the whole screen or in a tile thereof. More than one commercial may be stored and switched periodically or as the advertiser deems necessary. Also, the commercial displayed may be rotated such that the user views different commercials in successive viewings of the listing (that is, the user does not see the same commercial two times in a row when viewing the advertiser's listing twice or once during a longer viewing period).

Alternatively, the advertising information, such as the commercial, may be played upon the user's request, after the advertiser listing is displayed to the user. According to this embodiment, after the display of the advertiser's listing, the user may click on an icon to have additional advertiser information, such a commercial or an infomercial, played.

Interactivity

After the user selects to play the infomercial, other information may be dropped off of the screen and the infomercial will play in full screen view. Alternatively, the infomercial is played in a tile of the screen. Also, the user may be able to stop playback of the commercial or infomercial. Further, the user may be able to have the commercial or infomercial re-appear at the point where it was stopped or at another point.

A help feature may also be provided to assist the user with the navigation or search of the advertiser information or with other features of the advertising channel.

Further, according to a preferred embodiment of the present invention, the user can issue a purchase order for a product displayed or act on a promotional information, such as a rebate or coupon. According to this aspect of the invention, the user would be able to click on an icon associated with a promotion of an advertiser's product, or otherwise select the product. At this point, the system would provide order information, such as an on-screen order form to the user. The user would provide information requested by the order screen, possibly including credit card information, and the system would transmit a signal to the advertiser for a purchase or order of the product. This preferred embodiment of the invention leverages the interactive nature of the present system, allowing a user to purchase a good or service promoted in advertising information in real-time.

Alternatively, the user's order would send the user to a webpage of the advertiser configured to process the order for the product. At this point the system could keep track of the order for record keeping and display the webpage. Providing internet information over a cable television network terminal is well known to those of ordinary skill in the art.

Also, according to a preferred embodiment, the user would be able to respond to a survey or questionnaire information displayed as the advertising information. In this way, the user could register a view or vote using the system. Such surveys or questionnaires may be used by commercial advertisers to learn about consumers or to promote products, and they may be used by educational, academic, research, or government organizations to collect data about a variety of topics from users in efficient and convenient ways.

Delivery Status Information

Referring to FIG. 1, according to a preferred embodiment of the present invention, the advertiser may be provided reporting information about the delivery of advertising information via the delivery status interface 32. FIG. 2 shows a Delivery Status Interface Application. Thus, reporting information about the number of times an advertiser's listing is accessed, its commercial or infomercial played, or other advertising information viewed may is provided to the advertiser. Such information may also be broken down boat geographic region, political region, or time of day and date. Trends and patterns of advertising information retrieval over the cable network can also be generated and reported in order to provide the advertiser with specific feedback about the effectiveness of various aspect of its marketing campaign. The delivery information could also be linked to other known factors about user demographic information and reported to make the feedback more specific.

According to an aspect of the present invention, delivery status interface 32 could provide real-time feedback to the advertiser about the advertising information displayed or played back to users. Accordingly, the advertiser, armed with this information, would be in a position to fine-tune the advertising content, time and place of run and/or format, making adjustments almost immediately. It is anticipated that advertising content could be displayed or run over the cable network within a very short time, subject to a possible reviewing for suitability of content and validation of payment by the advertiser.

The previous description of various embodiments and features of the present invention are provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents thereof.

There is claimed:

1. A television network content delivery system configured to provide advertising information via a digital broadcast channel of a television network which is a cable network or a satellite network, said television network content delivery system comprising:
a data gateway configured to store the advertising information, the advertising information being adapted by a cable content generator for transmission over the digital broadcast channel of the television network based on content information received from an advertiser over an internet;
an advertising information retriever configured to:
process a user search received via the digital broadcast channel of the television network,
determine whether the received user search includes a designation of a geographic location,
retrieve the advertising information from said data gateway for a local area of the user based on the user search unless the user search is determined to include the designation of the geographic location, the local area of the user comprising at least one of a state of the user, a zip code of the user, and a city of the user, and
retrieve the advertising information from said data gateway for a designated geographic location if the received user search includes the designation of the geographic location; and
an advertising information provider configured to transmit, based on the user search, advertising information retrieved by said advertising information retriever via the digital broadcast channel of the television network,
wherein the user search is an advertiser search command that comprises at least a category of advertising.

2. The television network content delivery system of claim 1, wherein:
the user search is transmitted by a user via a set-top box or a television to the digital broadcast channel of the television network,
based on the category of advertising, the advertising information retriever searches advertising information listings stored in the data gateway and selects the advertising listings that match the designated category and other criteria,
and
the set-top box or the television is connected to the television network via at least one of a cable wire, an antenna receiving a television broadcast frequency, a satellite dish or other wireless connection.

3. The television network content delivery system of claim 1, wherein the advertising information includes at least one of an advertiser listing, a text message, a survey questionnaire, a picture, an audio clip, and a video clip.

4. The television network content delivery system of claim 1, wherein the television network content delivery system is implemented as at least two data processors comprising a cable headend server and a master server.

5. The television network content delivery system of claim 1, wherein the advertiser search command includes an advertising information temporal selection, and the method further comprises:
selecting the advertising information designated by the advertiser for a designated time period.

6. The television network content delivery system of claim 1, wherein the category of advertising is one of a field of business endeavor of the advertiser, type of organization of the advertiser, and type of product advertised by the advertiser.

7. The television network content delivery system of claim 1, further comprising a delivery status interface configured to generate a report provided to the advertiser about delivery of the advertising information over the digital broadcast channel of the television network, the report indicating the number of times the advertising information was viewed.

8. The television network content delivery system of claim 1, wherein the advertising information retriever is further configured to process another user search including one of a response to a survey questionnaire transmitted to the user as the advertising information and an order for a selected product via the same digital broadcast channel.

9. An advertising content interface configured to provide advertising information adapted for transmission over a digital broadcast channel of a television network by a television network headend, said advertising content interface comprising:
an interface unit configured to receive content information from an advertiser via an internet in an internet format;
a cable content generator configured to process the content information received by said advertiser interface, and convert the processed content information into a cable network format or a satellite network format that is retrieved by a retriever as an overlay over any of cable network or satellite network channels as requested by the retriever; and
a data gateway configured to store the advertising information generated by said cable content generator and to respond to an information demand from a cable network by providing the advertising information to the cable network headend for transmission over the cable network, the advertising information is retrieved by the retriever for a local area of a user based on a user search unless the user search includes a designation of a geographic location, and the local area of the user comprises at least one of a state of the user, a zip code of the user, and a city of the user wherein the information demand is transmitted to the data gateway via the same digital broadcast channel as the advertising information is provided to the cable network headend.

10. The advertising content interface of claim 9, wherein the data gateway provides the advertising information to the cable network headend for transmission over the cable network responsive to the information demand, the information demand being a transmission of a user command over the cable network by a user.

11. The advertising content interface of claim 9, wherein the content information includes at least one of a geographic parameter and a temporal parameter, such that the cable network transmits the advertising information corresponding to the content information only within, respectively, a geographical area and a time period.

12. The advertising content interface of claim 9, wherein the advertising information includes at least one of an advertiser listing, a text message, a survey questionnaire, a picture, an audio clip, and a video clip.

13. The advertising content interface of claim 9, further comprising a business mediator, configured to validate an order from the advertiser, the order requesting transmission of the content information to be transmitted.

14. The advertising content interface of claim 9, further comprising a delivery status interface configured to generate a report provided to the advertiser about delivery of the advertising information over the cable network, the report including the number of times the advertising information was viewed.

15. A method of receiving content information and to provide advertising information over a cable network or a satellite network, said method comprising:

receiving content information from an advertiser via an internet;

processing the content information received and generating advertising information adapted for transmission over the cable network;

storing the generated advertising information;

receiving via the digital broadcast channel of the television network which comprises a the cable network or the satellite network an advertising search;

determining whether the received advertising search includes a designation of a geographic location;

retrieving the stored advertising information for a local area of a user based on the advertising search unless the advertising search is determined to include the designation of the geographic location; the local area of the user comprising at least one of a state of the user, a zip code of the user, and a city of the user, retrieving the stored advertising information for a designated geographic location if the advertising search includes the designation of the geographic location; and providing the retrieved advertising information via the digital broadcast channel of the television network, wherein the advertising search is an advertiser search command that comprises at least a category of advertising.

16. The method of claim 15, wherein the advertising information includes at least one of an advertiser listing, a text message, a survey questionnaire, a picture, an audio clip, and a video clip.

17. The method of claim 15, wherein the advertising search includes at least one of the designation of the geographic location and an advertising information temporal selection, and the method further comprises:

selecting, respectively, the advertising information designated by the advertiser for a designated geographic location and the advertising information designated by the advertiser for a designated time period.

18. The method of claim 15, further comprising processing a user search including at least one of a response to a survey questionnaire transmitted as the advertising information and an order for a selected item based on the advertising information via the same digital broadcast channel.

19. The television network content delivery system of claim 1, wherein the user search is provided to the television network via the satellite network and wherein the advertising content is provided as an overlay on a television channel being viewed by the user.

20. The advertising content interface of claim 9, wherein the cable content generator generates the advertising information adapted for transmission over the satellite network.

* * * * *